United States Patent

Aronne

[11] Patent Number: 4,775,119
[45] Date of Patent: Oct. 4, 1988

[54] AIRCRAFT CREW MULTIPURPOSE, UNITARY BACKPACK FOR BAILOUT AND SURVIVAL

[75] Inventor: Armand J. Aronne, Massapequa, N.Y.

[73] Assignee: Grumman Aerospace Corporation, Bethpage, N.Y.

[21] Appl. No.: 31,549

[22] Filed: Mar. 30, 1987

[51] Int. Cl.⁴ .............................................. B64D 17/42
[52] U.S. Cl. .................... 244/148; 224/210; 224/261
[58] Field of Search ........... 244/142, 147, 148, 122 A, 244/1 R; 224/210, 211, 261, 262

[56] References Cited

U.S. PATENT DOCUMENTS

| | | | |
|---|---|---|---|
| 1,448,918 | 3/1923 | Drager | 224/261 |
| 2,114,301 | 4/1938 | Harrigan . | |
| 2,222,903 | 11/1940 | Hart . | |
| 2,318,673 | 5/1943 | Coleman . | |
| 2,380,372 | 7/1935 | Alderfer . | |
| 2,469,037 | 4/1949 | Kajdan . | |
| 2,992,798 | 7/1961 | Smith et al. . | |
| 3,016,218 | 1/1962 | Sepp, Jr. . | |
| 3,087,694 | 4/1963 | Sepp, Jr. | 244/148 |
| 3,087,696 | 4/1963 | Sepp, Jr. | 244/148 |
| 3,107,370 | 10/1963 | Gaylord . | |
| 3,436,037 | 4/1969 | Stanley . | |
| 3,519,223 | 7/1970 | Poehlmann et al. . | |
| 3,602,463 | 8/1971 | Koochembere . | |
| 3,690,604 | 9/1987 | Gullfoyle . | |
| 3,757,371 | 9/1973 | Martin . | |
| 3,768,761 | 10/1973 | Cramer | 244/148 |
| 4,034,940 | 7/1977 | Bird | 244/148 |
| 4,169,568 | 10/1979 | Drew et al. | 244/148 |
| 4,214,685 | 7/1980 | Pletz | 224/211 |
| 4,491,258 | 1/1985 | Jones | 224/210 |

FOREIGN PATENT DOCUMENTS

| | | | |
|---|---|---|---|
| 1461682 | 11/1965 | France | 244/148 |
| 903777 | 8/1962 | United Kingdom | 244/148 |

Primary Examiner—Galen Barefoot
Attorney, Agent, or Firm—Richard G. Geib; Daniel J. Tick; Bernard S. Hoffman

[57] ABSTRACT

A backpack for a wearer in an aircraft has a rigid housing releasably storing equipment for bailing out of the wearer from the aircraft over land, water and all types of surfaces under all types of surface conditions and for survival of the wearer during, upon and after descent.

8 Claims, 2 Drawing Sheets

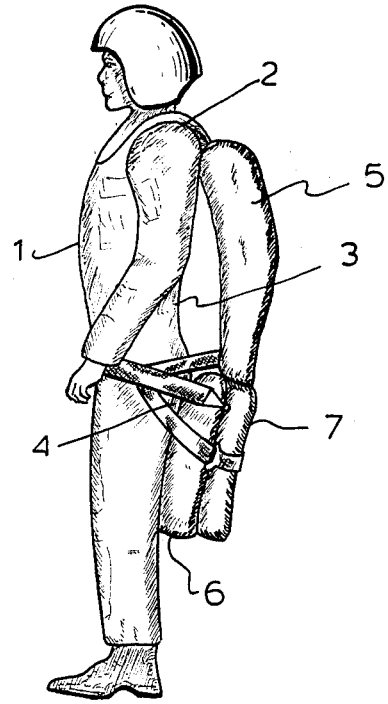
Fig.1 (PRIOR ART)
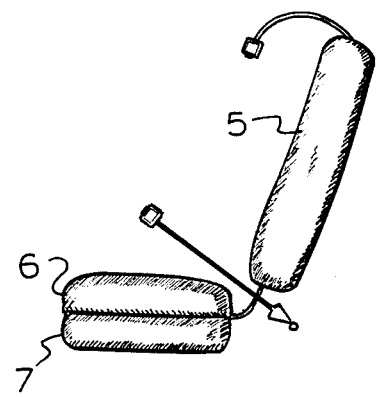
Fig.2 (PRIOR ART)
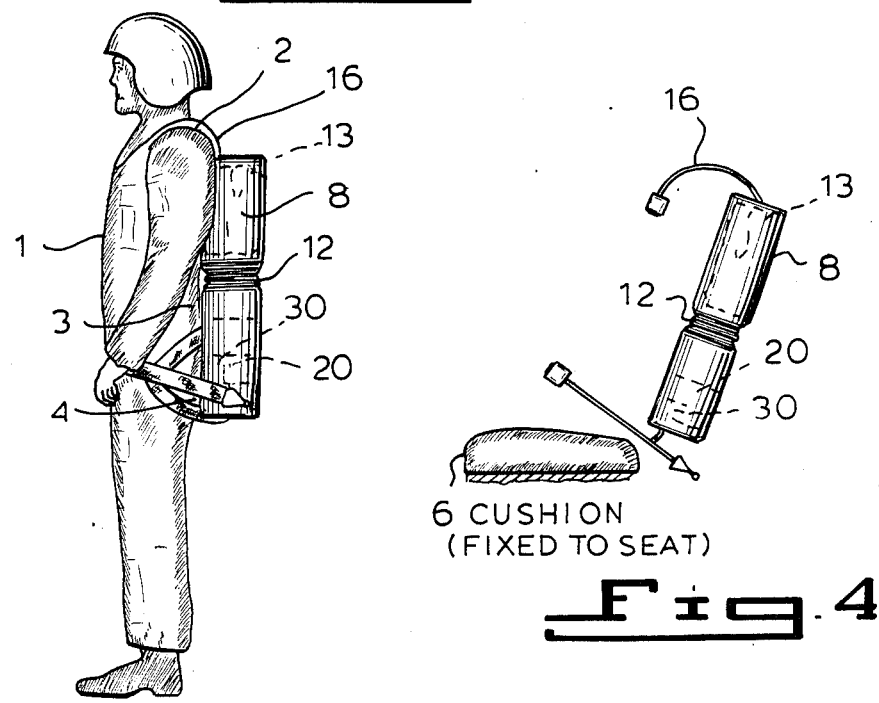
6 CUSHION (FIXED TO SEAT)
Fig.3
Fig.4

AIRCRAFT CREW MULTIPURPOSE, UNITARY BACKPACK FOR BAILOUT AND SURVIVAL

BACKGROUND OF THE INVENTION

The present invention relates to a backpack. More particularly, the invention relates to a multipurpose, unitary aircraft crew backpack for bailout and survival.

The entrance door to the Grumman E-2C, which is also the bailout door, is on the left side of the aircraft just forward and below the wing. The door folds out to become steps for ingress and egress and is jettisoned for bailout. There are two ditching hatches in the pilots' compartment over the two pilots. There is a ditching hatch in the C.I.C. compartment that is aft of the wing on the right hand side. At the present time, all parachute assemblies consist only of parachutes and function only as parachutes. The provision of any additional function would require hanging a kit from the parachute assembly, as shown in FIG. 1. The procedure during bailout is to jettison the bailout door and for the crew and pilots to disconnect themselves from their seats, activate their emergency oxygen system if required, get up out of their seats with all of their survival gear, move to the bailout door as quickly as possible and bailout. In the ditching scenario, after the aircraft comes to rest, the crewman disconnects from the parachute/survival kit assembly, turns around, time permitting, extracts the survival kit from beneath the seat cushion, throws the survival kit out of the open hatch, and exits the aircraft.

There are a number of problems with bailing out of an aircraft such as the Grumman E-2C. The aircraft is packed with electronic gear and therefore has only a minimum aisle at the center of the aircraft, adjacent the bailout door. Headroom in this aircraft is such that some stooping is required when going through a hatchway or when moving around outside the main center aisle, where there is the most headroom. Because of this, getting up out of the seat is somewhat restricted and the crewman must be careful to go through the bailout egress in a positive manner and carefully get up out of the seat with all of his survival equipment, turn in the right direction and move quickly to the bailout door. When the crewman gets up out of the seat, he must rise up sufficiently to extract the cushion and survival kit assembly completely out of the seat bucket, then turn around (pilots' compartment), move past the steering column, get to the aisle and exit the aircraft. The seat pan assembly of the prior art stores the survival kit and hangs down from the parachute pack and hits the legs of the wearer behind the knees and makes walking difficult. The total weight of this parachute/survival kit assembly is about 52 pounds. If the aircraft flight cannot be controlled sufficiently during bailout, it can be very difficult for a man to get out of the seat and egress the aircraft with this heavy, bulky equipment hanging from his back.

The principal object of the invention is to provide a new and improved aircraft crew unitary backpack for bailout and survival.

An object of the invention is to provide a multipurpose, unitary aircraft crew backpack for bailout and survival.

Another object of the invention is to provide a unitary backpack for aircraft crewmen which stores a parachute and survival equipment in a single pack.

Still another object of the invention is to provide an aircraft crew multipurpose, unitary backpack which includes a standard parachute and adds other survival equipment without increasing the size of the backpack.

Yet another object of the invention is to provide an aircraft crew multipurpose, unitary backpack which is sufficiently compactly packaged to better facilitate emergency egress from an aircraft.

Another object of the invention is to provide a multipurpose aircraft crew backpack which is lighter in weight than known backpacks for aircraft crewmen.

Still another object of the invention is to provide a multipurpose, unitary aicraft crew backpack of smaller volume than known backpacks which, when mounted on a wearer extends along his back from shoulders to buttocks and which stores bailout and survival equipment.

Yet another object of the invention is to provide an aircraft crew multipurpose, unitary backpack of simple structure, which is bendable, to add to the comfort of the wearer.

Another object of the invention is to provide an aircraft crew multipurpose, unitary backpack which, when worn, permits the wearer to walk normally, without obstruction.

Still another object of the invention is to provide an aircraft crew unitary backpack housing a parachute and survival equipment, which backpack is lighter in weight and smaller in volume than known backpacks, of simple structure and bendable, to add to the comfort of the wearer.

Yet another object of the invention is to provide an aircraft crew multipurpose, unitary backpack which, when mounted on a wearer extends along his back from shoulders to buttocks, thereby permitting the wearer to walk normally, without obstruction, while in an aircraft and stores equipment for descent after bailout and survival upon and after descent.

BRIEF SUMMARY OF THE INVENTION

The aircraft crew multipurpose, unitary backpack of the invention utilizes new technology components and efficient packing to provide the following capabilities to said backpack, although many other variations are possible. The backpack of the invention is primarily a parachute, but includes a one-man life raft, survival equipment and bailout oxygen.

The aircraft crew multipurpose, unitary backpack of the invention evolves around miniaturization of equipment so that the parachute, survival equipment, including oxygen, utilizable during flight and descent and after bailout, could be located in the same area behind the crewman previously housing only the parachute usually used, known as the NB-7. This miniaturization is achieved by changing the parachute canopy from a 28 foot flat canopy to a 26 foot conical canopy having a smaller packed volume, but a similar descent rate. The survival equipment is miniaturized by changing from the standard life raft, known as the LR-1, to a newer miniraft, known as LRU-18U. Water as stored in a bag, rather than in a can, as previously. In order to pack all of this equipment into the restricted area, a rigid housing is required. The material selected for the housing is Fiberglass. A first compartment is formed at the top of the pack to house the parachute and a second compartment is formed at the bottom of the pack to house the survival equipment, which includes an emergency oxygen system and a life raft. The backpack of the invention provides comfort, mobility, restraint and improved emergency egress for the wearer. The bulk of material of the former parachute assembly, including the seat cushion and the seat survival pack replaced, has been reduced considerably and the weight of equipment for the bailout mode is decreased sixteen pounds from 53 pounds to 37 pounds. The 26 foot conical parachute used with the torso harness in the backpack of the invention performs very well.

The miniaturized assembly of the invention provides, as a minimum, comfort and mobility better than that of the NB-7 type parachute pack. The first mock-up backpack was assembled and tested by various crews. It was found that there was decreased rotational mobility when sitting in the seat and that the reach forward was less for some individuals. After some analysis and testing it was found that reach, while sitting in the seat, straight forward and down was acceptable and that reaching for a handle such as the rudder pedal adjust handle was poor. We found that when reaching forward or straight down, the back of the wearer is kept somewhat straight, but when something is at a 45° angle such as, for example, the rudder pedal adjust handle, some people arch their backs. This arching of the back would cause the back to hit the rigid Fiberglass pack about midway and forward travel of the wearer or crewman would be restricted. The pack was redesigned to bend at approximately the center. The parachute is placed in the upper half of the backpack and the survival equipment is placed in the lower half of said backpack. The bending of the backpack of the invention permits the wearer's back to curve, the top of the pack is not as restricted and the wearer may bend and reach items such as the rudder adjust handle, as well as with the previously used NB-7 type pack. Furthermore, the shoulder harness fittings are replaced by hinged fittings that compensate somewhat for the rotating forward and down condition of the shoulder harness release whip. The seat parachute support is redesigned to facilitate movement of the parachute as the wearer or crewman turns, bends to the side, or moves forward. Part of the back of the seat cushion is removed to permit this movement. The seat cushion is now affixed to the seat, since it no longer goes with the wearer or crewman. Since there is no longer any survival equipment in the seat bucket, the seat bucket is actually no longer required. All that is required is a platform for a seat cushion that will accept all flight and crash loads. In future seat designs, the area under the seat could be used for other equipment, the floor could be raised, or mechanisms used in conjunction with the steering column or operation of the aircraft could be placed in this area.

In accordance with the invention, a backpack is provided for a wearer in an aircraft. The backpack comprises a substantially rigid unitary housing releasably storing equipment for bailing out of the wearer from the aircraft over land, water and all types of surfaces under all types of surface conditions and for survival of the wearer during, upon and after descent.

The wearer has shoulders, a back extending below the shoulders and buttocks below the back. The equipment for bailing out of the wearer from the aircraft comprises a parachute adapted for connection to the wearer and having a harness releasably attachable the wearer for movably carrying the housing and having the parachute affixed thereto. The housing extends along the back of the wearer from the shoulders to the buttocks.

The equipment for survival of the wearer during descent comprises an emergency oxygen system. The equipment for survival of the wearer upon and after descent comprises an inflatable life raft and raft inflating means.

The housing has first and second compartments therein and an area of less rigid material in the housing to enable the housing to bend when the wearer bends. The first compartment has an open back and stores the parachute in the first compartment, flaps at the open back to releasably confine the parachute to the housing and fastening means for securing the flaps. The fastening means releases the flaps upon emergence of the parachute from the housing.

The second compartment of the housing has a divider therein forming first and second areas separated by the divider. The first and second areas store the equipment for survival of the wearer during descent and upon and after descent therein.

The housing consists of plastic material and the divider is removable and consists of metal.

The housing preferably consists of Fiberglass.

The inflatable life raft is stored in the first area of the second compartment. The flaps consist of Nylon and the fastening means consists of Velcro.

The inflatable life raft is stored in the first area of said second compartment. The raft inflating means is stored in the second area of the second compartment. The emergency oxygen system is stored in the second area.

The life raft consists of a miniraft. The raft inflating means consists of a container of carbon dioxide. The emergency oxygen system comprises containers of high pressure oxygen, manifold means coupled to the containers of oxygen, oxygen regulating means coupled to the manifold means, a manual actuation knob for controlling the oxygen regulating means, an oxygen mask and a breathing hose coupling the oxygen regulating means to the mask.

The equipment for survival of the wearer after descent further comprises a bag of water stored in the second area.

BRIEF DESCRIPTION OF THE DRAWINGS

In order that the invention may be readily carried into effect, it will now be described with reference to the accompanying drawings, wherein:

FIG. 1 is a schematic diagram of a known embodiment of an aircraft crew backpack worn by a crew member;

FIG. 2 is a view of the embodiment of FIG. 1 when the wearer is seated;

FIG. 3 is a schematic diagram of an embodiment of the aircraft crew multipurpose, unitary backpack of the invention worn by a crew member;

FIG. 4 is a view of the embodiment of FIG. 3 when the wearer is seated;

DETAILED DESCRIPTION OF A PREFERRED EMBODIMENT

Figure 5:
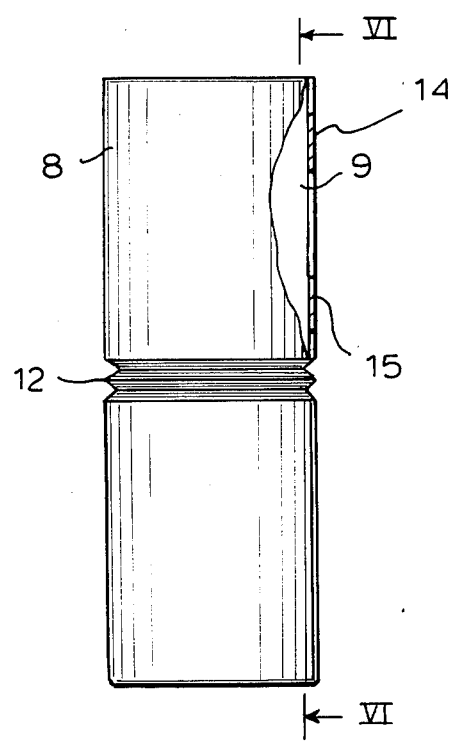
FIG. 5 is a side view, on an enlarged scale, partly cut away and partly in section, of the embodiment of FIG. 3.

The aircraft crew multipurpose, unitary backpak of the invention is for a wearer, crewman, or crew member 1 (FIGS. 1 and 3) in an aircraft. The wearer 1 has shoulders 2, a back 3 extending below said shoulders and buttocks 4 below said back, as shown in FIGS. 1 and 3.

The backpack of the prior art, as shown in FIGS. 1 and 2, consists of two separate packs, an upper pack 5 for a parachute, which is usually the NB-7 type parachute, a seat cushion 6 and a lower pack 7 for survival equipment. The lower pack 7 hangs from the upper pack 5. The known backpack has the disadvantages hereinbefore discussed. When seated, the wearer or crew member 1 sits on the seat cushion 6 and the survival equipment lower pack 7.

The presently used NB-7 type parachute of the pack 5 (FIGS. 1 and 2) utilizes two shoulder harness straps integrated into the riser assemblies. Each of the shoulder harness straps 2 has a small fitting with a hole in it that attaches to the "whip assembly" of the seat. The whip assembly is routed down behind the pack to the unlatching system of the seat. At the top of the whip is a fitting which affixes the assembly to the inertia reel strap of the seat. In the egress situation, the conduit in the "whip" pulls down, lowering a pin that unlocks the two shoulder harness fittings and frees the crewman from the upper part of the seat. At the bottom of the pack are two lap belt assemblies whose fittings lock into the seat. These two fittings are also unlocked at the same time the two shoulder harness fittings are released. The "whip" design, which has been used in many seat designs, is not optimum with regard to comfort, because the point of rotation of the whip is aft of the point of rotation, or hip, of the crewman or wearer and therefore the shoulder harness fittings/inertia reel fitting at the top of the whip tends to rotate down and into the pack as the crewman leans forward in the seat. This parachute utilizes a 28 foot flat canopy, a pilot parachute, a manual rip cord and handle assembly and cross-connector straps at the "speed links." At the bottom of the parachute pack is a zipper which connects it to the survival equipment pack 7.

The LR-1 type survival equipment of the pack 7 (FIGS. 1 and 2) is primarily for use with non-ejectable crew seats. This survival equipment is inserted in a cloth container affixed to the seat cushion of the seat and the bottom of the NB-7 type parachute assembly and includes the standard U.S. Navy single life raft, other items and a lanyard assembly that may be attached to the crewman's harness. A metal snap at the front of the cloth container may be unlocked to permit the withdrawal of the LR-1 survival equipment under emergency ditching conditions.

The H-2 type emergency oxygen assembly of the survival equipment of the lower pack 7 (FIGS. 1 and 2) includes a 22 cubic inch bottle, a manifold with a metering orifice and a lanyard having an actuation knob (not shown in the FIGS.). This emergency oxygen assembly has been used for many years, is housed in a compartment at the front of the seat cushion 6 (FIGS. 1 and 2), and provides a minimal supply of emergency oxygen for flight and for emergency bailout. The seat cushion 6, the LR-1 type survival kit and the NB-7 type parachute are all connected together for the bailout mode.

The aircraft crew member multipurpose, unitary backpack of the invention comprises a substantially rigid housing 8 (FIGS. 3 to 6) releasably storing equipment for bailing out of the wearer from the aircraft over land, water and all types of surfaces under all types of surface conditions and for survival of said wearer during, upon and after descent. The housing 8 has first and second compartments 9 and 10, respectively, therein (FIG. 6) formed by a divider 11 (FIG. 6) which is removable and preferably consists of metal. Less rigid material 12 (FIGS. 3 to 6) is provided in the housing 8 to enable said housing to bend when the wearer or crew member 1 bends. The first compartment 9 has an open back. A parachute 13 (FIG. 6) is packed in the first compartment 9 and is adapted to be releasably connected or strapped to the wearer 1 in the usual manner.

The parachute assembly is essentially a combination of the NB-6 and NB-7 type parachute configurations. The 26 ft. conical parachute is packed the same way as the NB-6, except that since the backpack of the invention is shorter than the known pack, the suspension lines require four more stow loops. Since the parachute assembly is used with the MA-2 type torso harness, the NB-7 type riser shoulder harness assembly is used. The NB-7 risers were tried without modification, but it was found that with the shorter pack, the risers consumed too much valuable space. The length of the NB-6 risers that were integral with the NB-6 harness were thus measured and it was found that the riser distance from the "speed links" to the juncture at the harness was a shorter dimension than that of the NB-7. Since the NB-6 was jumped and qualified with this particular riser geometry and since the NB-7 risers took up too much space in the pack, the new risers were made to the NB-6 length. Risers used with the MA-2 torso harness with its two parachute "Koch" fittings require cross-connector straps between the two front and between the two rear risers. This is required, so that if one of the "Koch" parachute release fittings inadvertently becomes disconnected, the parachute will translate approximately 16 inches the length of the cross-connector strap, and the parachute will allow the crewman to descend on a very slightly impaired, or tilted, parachute system. The NB-6 does not use cross-connector straps, because the risers are integral with the harness. One interesting aspect of riser length and utilization or non-utilization of cross-connector straps is the relationship to personal equipment such as the LPA-1 life preserver worn by U.S. Navy personnel. If cross-connector straps are used, their length and the length of the risers will determine the lateral angle of the risers and their proximity to the head and helmet of the crewman. If the riser is shortened, as in this particular case, and the cross-connector straps are kept at the same 16 inch length, the riser will angle slightly more away from the head and provide a bit more room between the head and the riser when a crewman is descending on the parachute into the water. The crewman must have the capability of inflating his life preserver while still hanging in the parachute. The importance of this riser angle/spacing is that it must be compatible with the life preserver and not prevent preserver inflation or prevent the crewman on the parachute from looking up or down during the parachute descent phase. In the parachute of the invention, the angle is increased and a larger opening is provided for the preserver. The parachute assembly of the invention uses the NB-7 rip cord conduit and handle assembly. The number of rip pins is decreased from four to three. The pilot parachute is the same as that used in the NB-6 parachute assembly. There are six pack opening bands to help open the pack. During testing, some tests were run without the bands, since once the rip pins were pulled the pilot parachute appeared to open the flaps sufficiently. During the testing, the bands were put back in. Packs of this shape do not appear to necessarily have to have pack opening bands. The assembly utilizes the NB-7 lanyard which pulls a pin to release the clamp holding the rip-cord cable conduit to the pack, since this is similar to that of the NB-7 and has to divorce the pack from the risers when the parachute is deployed, so that the parachute canopy and risers may be jettisoned on landing.

Four Nylon cloth flaps, of which two, 14 and 15, are shown in FIG. 5, are individually affixed via Velcro to the housing 8 at its open back and releasably confine the parachute 13 to said housing. Snap fasteners (not shown in the FIGS.) secure the flaps and permit easy replacement of any of said flaps. The Velcro releases the flaps upon emergence of the parachute 13 from the housing 8. A harness 16 (FIGS. 3 and 4) is releasably attachable to the body 1 for movably carrying the housing 8 and the parachute 13 is affixed to said harness.

When the backpack is worn, the housing 8 extends along the back 3 of the wearer or crewman 1, as shown in FIG. 3, from the shoulders 2 to the buttocks 4, so that said backpack does not interfere with normal walking of said wearer.

The housing 8 preferably consists of plastic or composite material such as, for example, Fiberglass. The second compartment 10 of the housing 8 has a divider 17 (FIG. 6) therein, forming first and second areas 18 and 19, respectively (FIG. 6) separated by said divider. The divider 17 is removable and preferably consists of metal.

Survival equipment 20 (FIGS. 3 and 4) is housed in the first and second areas 18 and 19. A release handle (not shown in the FIGS.) is located on the left hand side of the backpack and may also be used as a carrying handle during ditching, or when removing survival equipment from said backpack after bailout. The survival equipment compartment is hinged at the middle in order to provide access to said equipment. The center divider 17 (FIG. 6) closes off one of the first and second areas 18 and 19 while the other is being accessed. The divider 17 is removable and also limits the amount of bulging of the Fiberglass. If the survival equipment is not kept within its design volume it would be impossible to insert it into the lower part of the backpack. The survival equipment is preferably attached to a lanyard assembly (not shown in the FIGS.). The lanyard is attached to the neck of the life raft $CO_2$ bottle, hereinafter decribed, attaches to the survival equipment and has a snap fastener that attaches to the divider 17. The lanyard extends from the bottom of the pack with sufficient length to allow another snap fastener at the end of the lanyard to be stowed in a shallow access pouch on the forward center area of the seat cushion. The snap may be affixed to the harness of the wearer or crewman 1 prior to bailout in order to prevent loss when the survival equipment is removed during descent or after landing.

Figure 6:
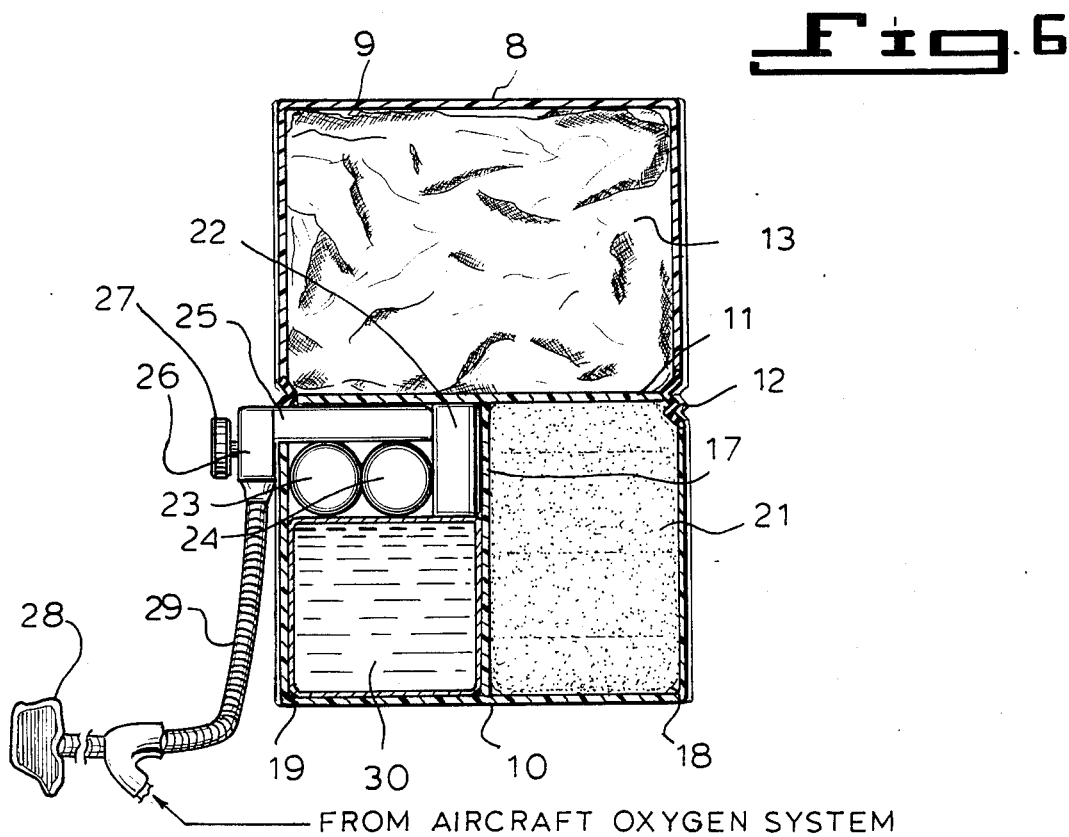
FIG. 6 is a cross-sectional view, taken along the lines VI—VI, of FIG. 5.

The survival equipment, as shown in FIG. 6, preferably comprises an inflatable life raft 21 in the first area 18 of the second compartment 10 (FIG. 6). The life raft 21 is preferably a miniraft. Raft inflating carbon dioxide is provided in a container 22 in the second area 19 of the second compartment 10 (FIG. 6).

An emergency oxygen system is stored in the second area 19 of the second compartment 10. The emergency oxygen system comprises, as shown in FIG. 6, containers 23 and 24 of high pressure oxygen, a manifold 25 coupled to the containers of oxygen, an oxygen regulator 26 coupled to the manifold and having a manual actuation knob 27, an oxygen mask 28 and a breathing hose 29 coupling the oxygen regulator to the mask.

A bag of water 30 (FIG. 6) is stored in the second area 19 of the second compartment 10.

The components of the oxygen system and the other components of the survival equipment are all known and may comprise any suitable items. The oxygen system provides emergency oxygen for flight and bailout. It provides an adequate supply of 44 cubic inches of oxygen for moderate or high breathing rates.

Although shown and described in what is believed to be the most practical and preferred embodiment, it is apparent that departures from the specific method and design described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

What is claimed is:

1. A backpack for a wearer in an aircraft, said wearer having shoulders, a back extending below said shoulders and buttocks below said back, said backpack comprising a substantially rigid unitary housing releasably storing equipment for bailing out of said wearer from said aircraft over land, water and all types of surfaces under all types of surface conditions and equipment for survival of said wearer during, upon and after descent, said equipment for bailing out of said wearer from said aircraft comprising a parachute adapted for connection to said wearer and having a harness releasably attachable to said wearer for movably carrying said housing and having said parachute affixed thereto, said housing extending along the back of said wearer from said shoulders to said buttocks, said housing having first and second compartments therein and an area of less rigid material in said housing to enable said housing to bend when said wearer bends, said first compartment having an open back and storing said parachute in said first compartmenet, flaps at said open back to releasably confine said parachute to said housing and fastening means for securing said flaps, said fastening means releasing said flaps upon emergence of said parachute from said housing, and said equipment for survival of said wearer during descent comprising an emergency oxygen system and said equipment for survival of said wearer upon and after descent comprising an inflatable life raft and raft inflating means.

2. A backpack as claimed in claim 1 wherein said second compartment of said housing has a divider therein forming first and second areas separated by said divider, said first and second areas storing said equipment for survival of said wearer during descent and upon and after descent therein.

3. A backpack as claimed in claim 2, wherein said housing consists of plastic material and said divider is removable and consists of metal.

4. A backpack as claimed in claim 2, wherein said housing consists of Fiberglass.

5. A backpack as claimed in claim 2, wherein said inflatable life raft is stored in said first area of said second compartment and wherein said flaps consist of Nylon and said fastening means consists of Velcro.

6. A backpack as claimed in claim 2, wherein said inflatable life raft is stored in said first area of said second compartment, said raft inflating means is stored in said second area of said second compartment and said emergency oxygen system is stored in said second area.

7. A backpack as claimed in claim 6, wherein said life raft consists of a miniraft, said raft inflating means consists of a container of carbon dioxide and said emergency oxygen system comprises containers of high pressure oxygen, manifold means coupled to said containers of oxygen, oxygen regulating means coupled to said manifold means, a manual actuation knob for controlling said oxygen regulating means, an oxygen mask and a breathing hose coupling said oxygen regulating means to said mask.

8. A backpack as claimed in claim 7, wherein said equipment for survival of said wearer after descent further comprises a bag of water stored in said second area.

* * * * *